(12) United States Patent
Tabler

(10) Patent No.: US 7,337,894 B2
(45) Date of Patent: Mar. 4, 2008

(54) CONVEYER FOR HIGH TEMPERATURE ENVIRONMENT

(76) Inventor: Charles P. Tabler, 7299 Southwind Ter., Cincinnati, OH (US) 45247

( * ) Notice: Subject to any disclaimer, the term of this patent is extended or adjusted under 35 U.S.C. 154(b) by 286 days.

(21) Appl. No.: 11/173,612

(22) Filed: Jul. 1, 2005

(65) Prior Publication Data

US 2007/0000757 A1    Jan. 4, 2007

(51) Int. Cl.
*B61B 13/12* (2006.01)
(52) U.S. Cl. .................. 198/465.4; 104/166
(58) Field of Classification Search ........... 198/465.4; 104/166
See application file for complete search history.

(56) References Cited

U.S. PATENT DOCUMENTS

| | | | | |
|---|---|---|---|---|
| 4,203,511 A | * | 5/1980 | Uhing | 198/458 |
| 4,358,999 A | * | 11/1982 | Nagahori | 104/166 |
| 4,367,683 A | * | 1/1983 | Tokunaga | 104/166 |
| 5,787,168 A | * | 7/1998 | Lien | 379/455 |
| 5,919,023 A | * | 7/1999 | Owens, Jr. | 414/155 |
| 6,032,785 A | * | 3/2000 | Beall, Jr. | 198/465.4 |
| 6,267,060 B1 | * | 7/2001 | Owens, Jr. | 104/166 |
| 6,293,388 B1 | * | 9/2001 | Felter | 198/465.4 |
| 6,457,418 B1 | * | 10/2002 | Persson | 104/166 |

* cited by examiner

*Primary Examiner*—Mark A Deuble
(74) *Attorney, Agent, or Firm*—Chase Law Firm, L.C.

(57) ABSTRACT

A chain drive overhead conveyer extends through an oven to move carriages between exit and entrance ends of respective rotary drive shafts that are outside the oven. Driven wheels of the carriages are canted with respect to the rotary drive shafts so that when a drive shaft is rotated, a helical loci of engagement between the drive shaft and engaged driven wheels provides sufficient traction to propel the carriages along the conveying path outside the oven. Weight of loaded carriages is carried through carriage support wheels to a load support structure adjacent to and independently of the rotary drive shafts and the chain conveyer through the conveying path. Heat sensitive portions of the carriages, e.g. the driven wheels, are chilled at the exit of the oven.

16 Claims, 2 Drawing Sheets

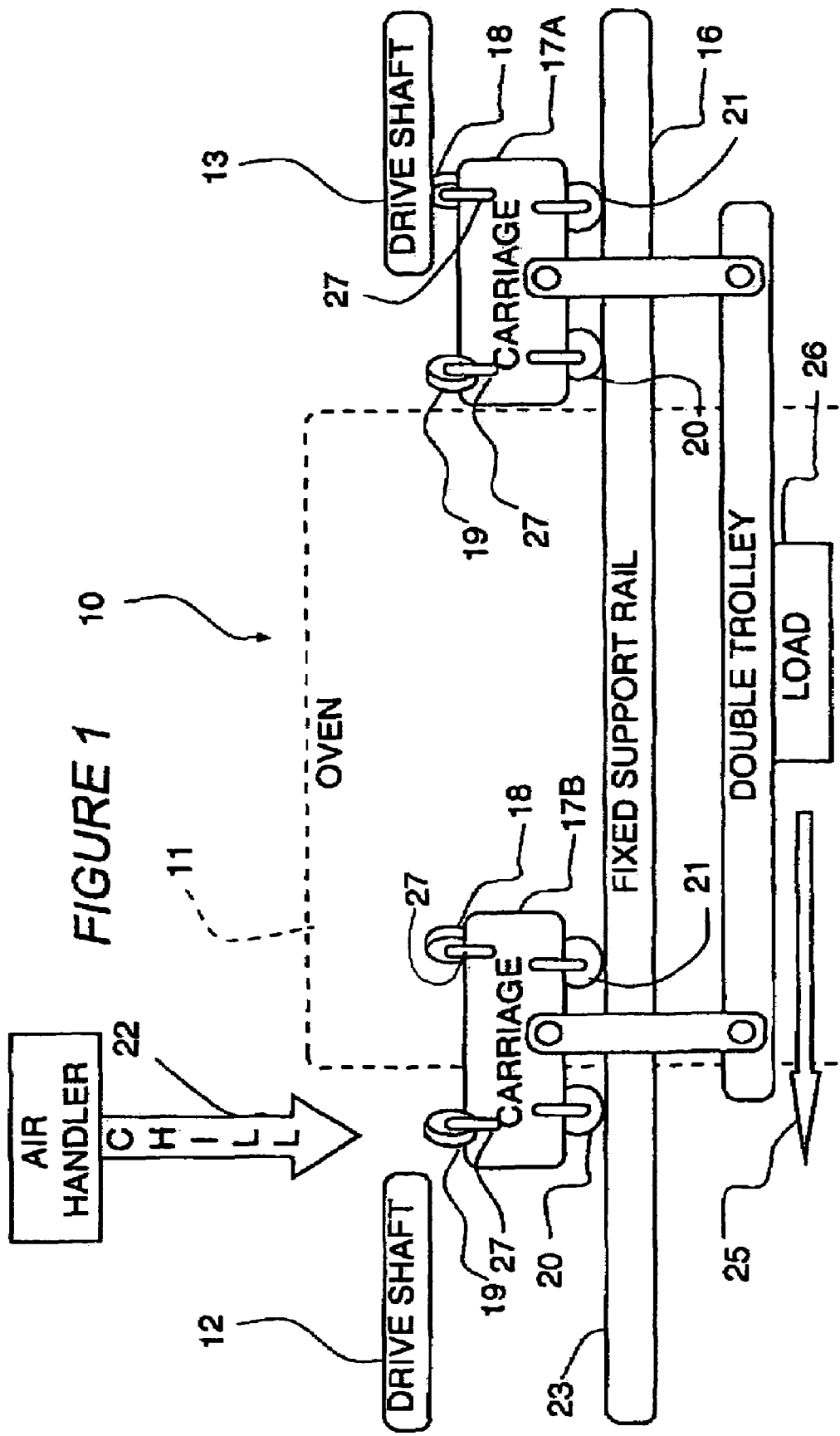

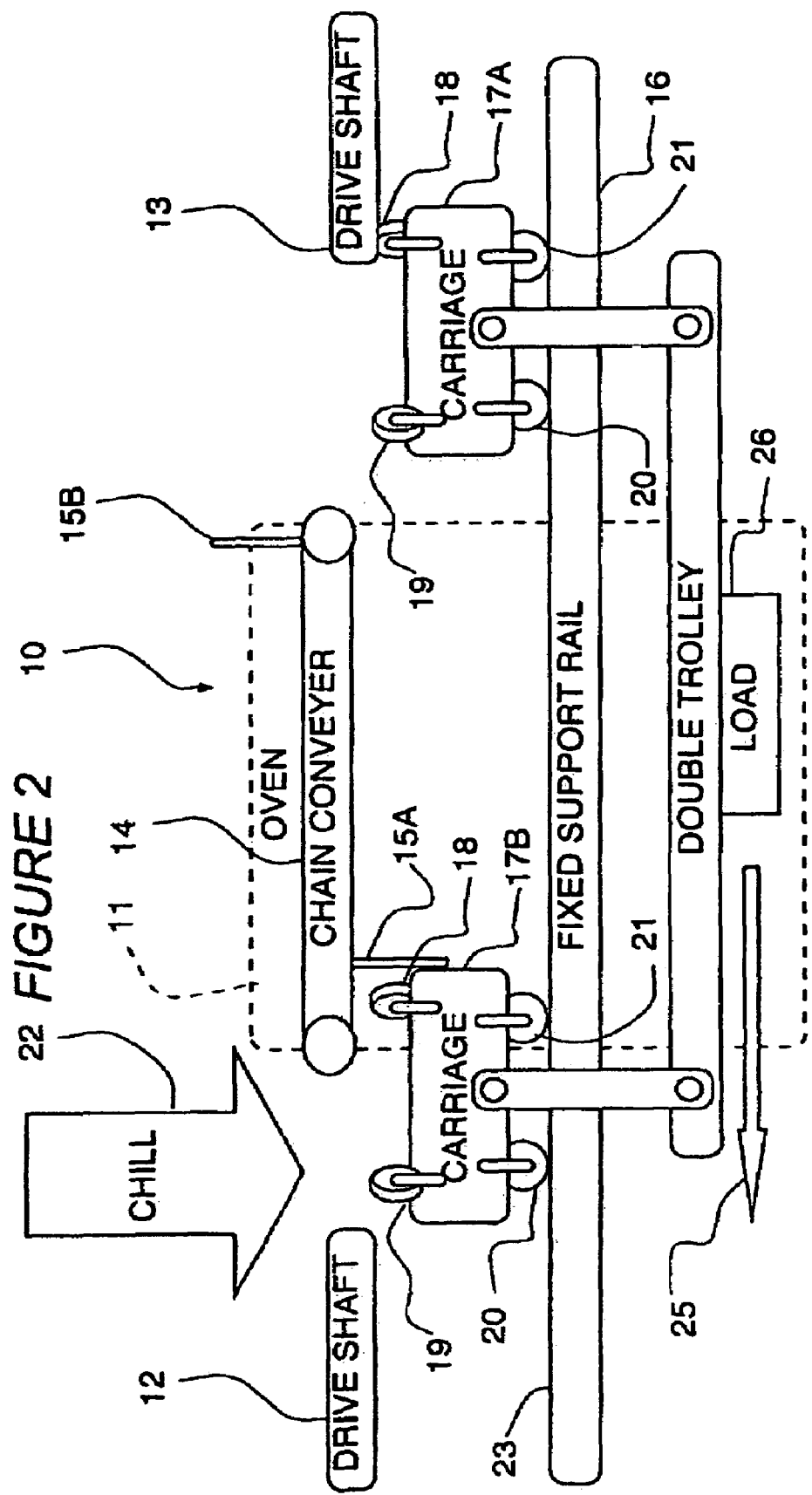

CONVEYER FOR HIGH TEMPERATURE ENVIRONMENT

FIELD OF THE INVENTION

The present invention relates to conveying material through a high temperature environment.

BACKGROUND OF THE INVENTION

Overhead conveyors of the rotary drive shaft type are disclosed in U.S. Pat. No. 5,806,655 issued Sep. 15, 1998 to Tabler, in U.S. Pat. No. 5,785,168 issued Jul. 28, 1998 to Beall, Jr., in U.S. Pat. No. 4,203,511 issued May 20, 1980 to Uhing, in U.S. Pat. No. 3,164,104 issued Jan. 5, 1965 to Hunt, and in U.S. Pat. No. 3,850,280 issued Nov. 26, 1974 to Ohrnell. In this rotary drive shaft type of overhead conveyer, one or a plurality of aligned rotary shafts extend along the conveying path, and skewed rollers contact the shafts to be driven linearly along the path as the shafts rotate, with the rollers being attached to the carriage for free relative rotation.

One environment wherein the overhead conveyor is used is that employing a high temperature, for example within an oven. Conveyers of the rotary drive shaft type are often used to feed to, pass through and exit from ovens, for example as set forth in U.S. Pat. No. 5,919,023 issued Jul. 6, 1999 to Owens, whose disclosure is incorporated herein in its entirety, by reference.

An alternative to the drive shaft overhead conveyer is a power and free chain driven conveyor. Overhead chain conveyers are well known, and they generally have an endless chain (a chain attached to itself in a loop and passing around two or more sprockets, one of which is driven) that carries a plurality of loads or pushers for loads.

SUMMARY OF THE INVENTION

The present inventor has analyzed problems in this field of the invention, identified and analyzed causes of the problems, and provided solutions to the problems. This analysis of the problems, the identification and analysis of the causes, and the provision of solutions are each parts of the present invention and will be set forth below.

As a result of analyzing the prior art, the inventor has found a need to improve the high temperature capabilities of the rotary drive shaft type of overhead conveyer in a high temperature environment.

Rotary shaft driven overhead conveyors have many advantages over the conveyors, such as the power and free conveyor. Such advantages including quietness, cleanliness, less repair, easy diversion of load carrying carriages, buffering, speed variation along the conveying path, and generally greater flexibility in design and modification or revision.

An example high temperature environment wherein the rotary drive shaft conveyer is presently at a disadvantage is that of the metal powder coating industry, which requires a temperature in the area of 425 degrees Fahrenheit to kick and set the powder on the part (load) being coated. It is known to employ driven rollers that have an outer peripheral surface that elastically deforms on driving contact with the rotary drive shaft to obtain the required driving friction there-between. The driven rollers fail when they take a permanent deformation or set, which occurs sooner with increased temperature. Further, the rotary drive shaft bearings, motor and transmission are subject to increased likelihood of failure within a high temperature environment.

Conventional rotating shaft driven overhead conveyors (rotary drive shaft type) are limited in the amount of heat they may endure within the oven, which is at least in part a function of the conveyer materials, oven temperature, amount of load and length of time within the oven, Failure due to heat is a particular problem when the load is heavy, as in the high load rotary drive shaft overhead conveyor of U.S. Pat. No. 5,785,168 issued Jul. 28, 1998, whose disclosure is incorporated herein in its entirety, by reference.

Therefore, there is a need to increase the heat tolerance of the rotary drive shaft type of overhead conveyor.

Through analysis of the above problem, the inventor has determined that factors increasing the likelihood of this driven wheel set include: increased load on the driven roller (increased conveyed load), increased time within the high temperature environment, increased temperature of the driven roller, and increased number of passes through the high temperature environment.

It is an object of the present invention to reduce the time that rotary shaft conveyer elements are subjected to the high temperature and to reduce the temperature or the driven wheel when it is subject to load, without reducing the time that the product is subjected to the high temperature. This is preferably achieved by chilling the driven wheels immediately upon their exiting the high temperature environment and before they are loaded.

It is an object to reduce the load and load time on the driven wheels when subjected to the high temperature. This is preferably achieved by removing the load from the driven wheels within a substantial portion or the high temperature environment, more particularly by using a chain conveyer to push or carry the load carrying carriages through the high temperature environment, It is an object to reduce the time that the rotary drive shaft (particularly its heat sensitive bearings and drive motor/transmission units) is subjected to the high temperature, particularly by using a chain conveyer to push or carry the load carrying carriages through the high temperature environment and removing the rotary drive shafts partially of wholly from the high temperature environment, Still other aspects, features, and advantages of the present invention are readily apparent from the following detailed description, simply by illustrating a number of particular embodiments and implementations, including the best mode contemplated by the inventor for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of a preferred embodiment, best mode and example, but not defined by way of limitation. Further objects, features and advantages of the present invention will become more clear from the following detailed description of implementing the invention, as shown in the figures of the accompanying drawing, in which like reference numerals refer to similar elements, wherein:

FIG. 1 is a schematic view, in elevation, of an overhead conveyer system layout according to an embodiment of the present invention; and FIG. 2 is a schematic view, in elevation, of an overhead conveyer system layout according to another embodiment of the present invention.

DESCRIPTION OF THE PREFERRED EMBODIMENT

As schematically shown in FIGS. 1 and 2, the powered overhead conveyor system 10 of the embodiment extends between processing stations, for example, from a spraying station (not shown) to the right of FIG. 1, through a drying oven 11 and to an inspection station (not shown) to the left of FIG. 1, of a process plant. The oven 11 is an example of a high temperature environment that would produce an unacceptable failure in a conventional rotating drive shaft overhead conveyer of the present type, but which is tolerated by the embodiment conveyer.

A conventional drive motor (not shown) has a drive shaft that drives a standard mechanical transmission (not shown). The transmission has a rotational power output. One motor and transmission is provided for each of the drive shafts 12, 13 to rotate them about respective axes, which in the figures are horizontal and extend along the conveying path direction 25.

To convert the rotary motion of the drive shafts 12, 13 into linear motion, at least one and most preferably four driven wheels 18, 19 (not shown in detail but disclosed in the above mentioned patents) engage the periphery of the drive shafts 12, 13. Each of these driven wheels 18, 19 is mounted for free rotation about a driven wheel axis that is non-parallel to the drive shaft axis and non-perpendicular to the drive shaft axis, preferably being at an acute angle thereto. The angle is selected according to desired linear speed and linear force along the conveying path. The driven wheels 18, 19 are preferably divided into two sets (not shown) for each of the carriages 17A, 17B. Thereby, when the drive shafts 12, 13 rotate, the driven wheels 18, 19 engage the drive shafts 12, 13 to form a helical loci of engagement about the periphery of the drive shafts 12, 13, so as to linearly power the driven wheels 18, 19 and the carriages 17A, 17B along the conveying path in the direction 25 that depends upon the direction of rotation of the drive shaft 12, 13.

Each of the carriages 17A and 17B is supported by freely rotatable and undriven support wheels 20, 21 on a fixed support rail 16 that extends in the conveying direction. A double trolley carrying load 26 is suspended from and accordingly driven by the carriages 17 A, 17B to also move in the conveying direction 25. A spring 27 biases the driven wheels 18, 19 upwardly away from the respective carriage 17A, 17B into engagement with the drive shafts 12, 13, in a conventional manner.

The drive shafts 12, 13, driven wheels 18, 19, carriages 17A, 17B, springs 27, wheels 20, 21, fixed support rail 16 and double trolley carrying the load 26 are conventional and will not be described in further detail, since they are described in the above patents and known in the field.

According to one new aspect of the embodiment, the drive shafts 12, 13 do not extend into the high temperature environment, that is, they do not extend into the oven 11. Therefore, the drive shafts and more importantly, their motors, transmissions and bearings are not subjected to the high temperature of the oven 11; accordingly, they do not prematurely fail. In FIG. 1, the rear carriage has its driven wheel set 18 in engagement with the drive shaft 13, to push the double trolley into the oven 11 until the lead driven wheel set 19 of the carriage 17B engages the drive shaft 12 to thereby pull the double trolley through the oven, all in the conveying direction 25. Thereby, it is seen that the driven wheels 18, 19 are not biased into engagement with the drive shafts 12, 13 when they are within the oven 11 and therefore not being deformed when in the oven.

Deformation of driven wheels when they are subjected to high temperature tends to produce accelerated degradation of the elastic material of the driven wheels. The driven wheels 18, 19, for example, may have an outer polyurethane tire. If a wheel takes a permanent deformation or set, it fails. Also if resiliency of a wheel is adjusted to escape permanent deformation, in high heat, it may loose its driving power under normal conditions. These problems are at least partially overcome by the drive shafts 12, 13 not being within the oven 11.

However, the driven wheels 18, 19 do heat up during transit of the oven and upon exiting the oven they may still be hot when they engage the drive shaft 12. The embodiment has further aspects that help to prevent failure and overcome this latter mentioned problem.

One further aspect is that a chill 22 is provided by an air handler, for example a blower, to the driven wheels 18, 19 immediately upon their exit from the oven and before they engage the drive shaft 12. The chill may be provided by a blast of cooled air from one or more directions. The chill will reduce the temperature of the driven wheels 18, 19 prior to their engaging the drive shaft 12, by an amount substantially greater that would be achieved without the chill.

Another further aspect, as shown in FIG. 2, is that the spacing between the exit end of the overhead chain conveyer 14 and the drive shaft 12 may be increased to provide for a greater chill time by: the overhead chain conveyer 14 extending a corresponding distance out of the entrance to the oven, and/or by the drive shaft 13 only driving the trailing carriage 17A long enough for the lead carriage 17B to be engaged by and driven by a drive abutment or dog 15A of the overhead chain conveyer 14. FIG. 2 is the most preferred embodiment for theses further aspects.

In FIG. 2, elements in common with FIG. 1 have been described with respect to FIG. 1. The overhead chain conveyer 14 drives the carriages 17A, 17B in the conveying direction 25 at a much slower speed than the speed of the carriages being driven by one or both of the drive shafts 12, 13. The advantage is that the oven 11 may correspondingly be of a smaller size to save initial and operating cost. Also, with the overhead chain conveyer 14 driving at a slower speed than the drive shaft conveyer, at least the lead carriage will be subjected to the chill for a longer time. Since the overhead chain conveyer 14 is driving the load out of the oven, the drive shaft 12 is preferably spaced further away from the oven 11 than in FIG. 1, so as to increase the chill time for both the carriages 17A and 17B. The drive shaft 13 is placed further away from the entrance to the oven 11 to protect it from the high temperatures of the oven 11.

The support wheels 20, 21 may be of materials that can easily withstand the high temperature environment of the oven 11, because this characteristic does not have to be compromised to obtain good driving friction as is the case of the driven wheels 18, 19. Thereby the support wheels, which are freely rotatable, may be constructed out of stainless steel or ceramic, for example.

While the present invention has been described in connection with a number of embodiments, implementations, modifications and variations that have advantages specific to them, the present invention is not necessarily so limited, but covers various obvious modifications and equivalent arrangements according to the broader aspects, all according to the spirit and scope of the following claims.

What is claimed is:

1. An overhead conveyor system, comprising:
   a plurality of carriages for suspending loads;
   a high temperature environment;
   an overhead powered conveyor for transporting said carriages serially along at least one conveying path into, through and out of said high temperature environment;
   said overhead powered conveyor having first and second rotary drive shafts with spaced apart distal ends and extending along said conveying path;
   each of said rotary drive shafts being mounted for rotation about respective shaft axes parallel to respective portions of the conveying path;
   said carriages each having a driven wheel having an axis of rotation nonparallel and non-perpendicular to said shaft axis, and said driven wheel being adapted to engage said drive shafts with sufficient traction to as to form a helical loci of engagement about the periphery of said drive shafts during rotation of said drive shafts about said shaft axis to power said carriages along the conveying path in a direction of the conveying path dependent upon a direction of rotation of said drive shafts;
   a chain drive overhead conveyer extending through said high temperature environment along the conveying path and being adapted to drive said carriages through the high temperature environment between said spaced apart distal ends of said rotary drive shafts;
   at least one undriven support wheel on each of said carriages; and
   a support surface extending throughout the conveying path adapted to support the undriven support wheels and thereby at least partially support a loaded corresponding carriage.

2. The overhead conveyor system according to claim 1, wherein said drive shafts are entirely outside of said high temperature environment.

3. The overhead conveyor system according to claim 1, further including an air handler adapted to cool heat sensitive portions of the carriages at the exit end of the oven prior to the driven wheels engaging a drive shaft.

4. The overhead conveyor system according to claim 1, further including an air handler adapted to cool said driven wheels at the exit end of the oven prior to the driven wheels engaging a drive shaft.

5. An overhead conveyor system, comprising:
   a plurality of carriages for suspending loads;
   a high temperature environment;
   an overhead powered conveyor for transporting said carriages serially along at least one conveying path into, through and out of said high temperature environment;
   said overhead powered conveyor having first and second rotary drive shafts with spaced apart distal ends and extending along said conveying path;
   each of said rotary drive shafts being mounted for rotation about respective shaft axes parallel to respective portions of the conveying path;
   said carriages each having a driven wheel having an axis of rotation nonparallel and nonperpendicular to said shaft axis, and said driven wheel being adapted to engage said drive shafts with sufficient traction to as to form a helical loci of engagement about the periphery of said drive shafts during rotation of said drive shafts about said shaft axis to power said carriages along the conveying path in a direction of the conveying path dependent upon a direction of rotation of said drive shafts;
   at least one undriven support wheel on each of said carriages; and
   a support surface extending throughout the conveying path adapted to support the undriven support wheels and thereby at least partially support a loaded corresponding carriage; and
   an air handler adapted to cool heat sensitive portions of the carriages at the exit end of the oven prior to the driven wheels engaging a drive shaft.

6. The overhead conveyor system according to claim 5, wherein said drive shafts are entirely outside of said high temperature environment.

7. A method of conveying along a conveying path that extends through a high temperature environment, comprising the steps of:
   moving the load carriages outside the high temperature environment by engaging rotary drive shafts with driven carriage wheels that are canted with respect to the rotary drive shafts, thereby defining a helical loci of engagement between the drive shaft and the engaged driven wheels to provide sufficient traction to propel the carriages along the conveying path;
   moving the load carriages within the high temperature environment by a chain drive conveyor; and
   throughout the conveying path, supporting the load carriages through load carriage support wheels to a fixed load support structure adjacent to and independently of the rotary drive shafts and the oven conveyor.

8. The method of claim 7, further including cooling heat sensitive portions of the carriages at the exit of the high temperature environment.

9. The method of claim 7, further including cooling the driven wheels at the exit end of the high temperature environment.

10. A method of conveying along a conveying path that extends through a high temperature environment, comprising the steps of:
    moving the load carriages outside the high temperature environment by engaging rotary drive shafts with driven carriage wheels that are canted with respect to the rotary drive shafts, thereby defining a helical loci of engagement between the drive shaft and the engaged driven wheels to provide sufficient traction to propel the carriages along the conveying path;
    moving the load carriages inside the high temperature environment along the conveying path while maintaining the driven carriage wheels unengaged for a major portion of the conveying path that is within the high temperature environment;
    throughout the conveying path, supporting the load carriages through load carriage support wheels to a fixed load support structure adjacent to and independently of the rotary drive shafts; and
    cooling the driven wheels and heat sensitive portions of the carriages at the exit end of the high temperature environment.

11. The method of claim 10, wherein said cooling occurs prior to the driven wheels engaging a drive shaft.

12. The method of claim 10, wherein said moving the load carriages inside the high temperature environment includes driving the carriages with a chain conveyer.

13. The method of claim 12, further
    including drivingly interconnecting two carriages to provide a leading carriage and a trailing carriage to support one load; and wherein
    said moving the load carriages outside the high temperature environment includes pushing the leading carriage into the high temperature environment by the trailing carriage independently of the chain conveyer and pulling the trailing carriage out of the high temperature environment by the leading carriage independently of the chain conveyer.

14. The method of claim 13, wherein said cooling occurs prior to the driven wheels engaging a drive shaft.

15. A method of conveying along a conveying path that extends through a high temperature environment, comprising the steps of:

moving the load carriages outside the high temperature environment by engaging rotary drive shafts with driven carriage wheels that are canted with respect to the rotary drive shafts, thereby defining a helical loci of engagement between the drive shaft and the engaged driven wheels to provide sufficient traction to propel the carriages along the conveying path;

moving the load carriages inside the high temperature environment along the conveying path while maintaining the driven carriage wheels unengaged for a major portion of the conveying path that is within the high temperature environment;

throughout the conveying path, supporting the load carriages through load carriage support wheels to a fixed load support structure adjacent to and independently of the rotary drive shafts; and said moving the load carriages inside the high temperature environment includes driving the carriages with a chain conveyor.

16. The method of claim 15, further including drivingly interconnecting two carriages to provide a leading carriage and a trailing carriage to support one load; and wherein said moving the load carriages outside the high temperature environment includes pushing the leading carriage into the high temperature environment by the trailing carriage independently of the chain conveyer and pulling the trailing carriage out of the high temperature environment by the leading carriage independently of the chain conveyer.

* * * * *